(12) United States Patent
Wilson, II et al.

(10) Patent No.: US 9,211,012 B1
(45) Date of Patent: Dec. 15, 2015

(54) SEATING ATTACHMENT DEVICE FOR A TAILGATE

(71) Applicants: Jeffery Lynne Wilson, II, Spring, TX (US); Krista Lynn Wilson, Spring, TX (US); Trevor Lynne Wilson, Spring, TX (US); Devon Lynne Wilson, Spring, TX (US); Kalina Lynn Wilson, Spring, TX (US)

(72) Inventors: Jeffery Lynne Wilson, II, Spring, TX (US); Krista Lynn Wilson, Spring, TX (US); Trevor Lynne Wilson, Spring, TX (US); Devon Lynne Wilson, Spring, TX (US); Kalina Lynn Wilson, Spring, TX (US)

( * ) Notice: Subject to any disclaimer, the term of this patent is extended or adjusted under 35 U.S.C. 154(b) by 0 days.

(21) Appl. No.: 14/497,123

(22) Filed: Sep. 25, 2014

(51) Int. Cl.
| | |
|---|---|
| A47C 1/14 | (2006.01) |
| A47C 7/66 | (2006.01) |
| A47C 7/54 | (2006.01) |
| A47C 4/00 | (2006.01) |
| A47C 7/50 | (2006.01) |
| A47C 7/38 | (2006.01) |
| B60N 2/30 | (2006.01) |

(52) U.S. Cl.
CPC . *A47C 1/146* (2013.01); *A47C 4/00* (2013.01); *A47C 7/38* (2013.01); *A47C 7/50* (2013.01); *A47C 7/543* (2013.01); *A47C 7/66* (2013.01); *B60N 2/3011* (2013.01); *B60N 2/3097* (2013.01)

(58) Field of Classification Search
CPC .......................... B60N 2/01508; B60N 2/3097
See application file for complete search history.

(56) References Cited

U.S. PATENT DOCUMENTS

| | | | | |
|---|---|---|---|---|
| 1,293,778 A | * | 2/1919 | Holm | 297/252 |
| 1,721,366 A | * | 7/1929 | Backstrom | 297/350 |
| D121,266 S | * | 7/1940 | Archer | D6/368 |
| 3,840,263 A | * | 10/1974 | Bowden | 296/10 |
| D252,658 S | * | 8/1979 | Kressin | D6/368 |
| 5,000,504 A | * | 3/1991 | Munguia | 296/65.07 |
| 5,078,443 A | * | 1/1992 | Austin | 296/63 |
| 5,139,301 A | * | 8/1992 | Lewis | 296/63 |
| 5,215,346 A | * | 6/1993 | Reitzloff et al. | 296/51 |
| 5,462,334 A | * | 10/1995 | Sedorcek et al. | 297/252 |
| D368,809 S | * | 4/1996 | Fields | D6/368 |
| 5,516,193 A | * | 5/1996 | Simpson | 297/252 |
| 5,533,774 A | * | 7/1996 | Cavanaugh | 296/66 |
| 5,971,464 A | * | 10/1999 | Davis et al. | 296/57.1 |
| 5,975,610 A | * | 11/1999 | Tracy | 296/63 |
| 6,116,676 A | * | 9/2000 | Edwards | 296/64 |
| 6,203,108 B1 | * | 3/2001 | Mattison, Jr. | 297/352 |
| 6,227,594 B1 | * | 5/2001 | Pommeret | 296/57.1 |
| 6,273,504 B1 | * | 8/2001 | Pace et al. | 297/219.1 |
| 6,286,885 B1 | * | 9/2001 | Ramos | 296/57.1 |
| 6,364,391 B1 | * | 4/2002 | Everett | 296/51 |
| 6,588,822 B1 | * | 7/2003 | Duvall, Jr. | 296/57.1 |
| 6,631,938 B1 | * | 10/2003 | Burns | 296/64 |
| 6,641,190 B2 | * | 11/2003 | Kirchhoff | 296/26.11 |
| 6,739,643 B1 | * | 5/2004 | Rock et al. | 296/64 |
| 6,808,231 B1 | * | 10/2004 | Hill | 297/217.7 |
| 6,824,186 B2 | * | 11/2004 | Brown | 296/65.16 |

(Continued)

*Primary Examiner* — Rodney Mintz (57) ABSTRACT

An invention for a tailgate lounge provides a portable and convenient means for seating for the tailgate of a vehicle. The tailgate lounge includes: a foldable bench, to seat to provide seating for the users; a collapsible awning, to protect the user from inclement weather as well as direct sunlight; and tailgate clips to attach and secure the tailgate lounge onto a vehicle. The foldable bench includes a seat, a reclining backrest, and a variable angular locking mechanism. The seat provides a sitting surface for the user while the backrest provides support. The variable angular locking mechanism allows the backrest to be secured at pre-determined angles to the seat. The tailgate lounge is able to be arranged in two primary configurations: a collapsed configuration for storage and transportation and an expanded configuration to provide additional seating.

16 Claims, 12 Drawing Sheets

(56) References Cited

U.S. PATENT DOCUMENTS

| | | | |
|---|---|---|---|
| 7,080,870 B1 * | 7/2006 | McCann et al. | 296/64 |
| 7,156,462 B2 * | 1/2007 | Verny et al. | 297/354.13 |
| 7,163,262 B2 * | 1/2007 | Anglin | 297/217.1 |
| 7,201,424 B1 * | 4/2007 | Fournier | 296/57.1 |
| 7,290,821 B1 * | 11/2007 | McCann et al. | 296/40 |
| 7,431,370 B2 * | 10/2008 | Fournier | 296/64 |
| 7,513,557 B2 * | 4/2009 | Leigh-Monstevens | 296/64 |
| 7,566,085 B2 * | 7/2009 | Jaskolski | 296/57.1 |
| 7,931,336 B2 * | 4/2011 | Miller | 297/252 |
| D651,820 S * | 1/2012 | Brown | D6/362 |
| 8,123,271 B1 * | 2/2012 | Wimberley | 296/63 |
| 8,333,263 B1 * | 12/2012 | Wright | 182/148 |
| 8,528,976 B2 * | 9/2013 | Wimberley | 297/352 |
| 8,991,894 B2 * | 3/2015 | Smith et al. | 296/100.09 |
| D731,858 S * | 6/2015 | Golic et al. | D7/605 |
| 2002/0109369 A1 * | 8/2002 | Boomhower et al. | 296/63 |
| 2003/0071505 A1 * | 4/2003 | Ferrell, Jr. | 297/352 |
| 2005/0067864 A1 * | 3/2005 | Anglin | 297/217.1 |
| 2007/0007789 A1 * | 1/2007 | Bowden et al. | 296/64 |
| 2007/0182193 A1 * | 8/2007 | Fournier | 296/57.1 |
| 2008/0246298 A1 * | 10/2008 | Leigh-Monstevens | 296/64 |
| 2011/0146737 A1 * | 6/2011 | Friedman et al. | 135/88.13 |
| 2012/0042920 A1 * | 2/2012 | Armstrong et al. | 135/153 |
| 2012/0104786 A1 * | 5/2012 | Wimberley | 296/65.16 |
| 2014/0333082 A1 * | 11/2014 | Smith et al. | 296/26.11 |
| 2015/0014502 A1 * | 1/2015 | McCaughan | 248/229.2 |

* cited by examiner

SEATING ATTACHMENT DEVICE FOR A TAILGATE

The current application claims a priority to the U.S. Provisional Patent application Ser. No. 61/894,513 filed on Oct. 23, 2013.

FIELD OF THE INVENTION

The present invention relates generally to an external seat for a truck with a tailgate. More specifically, the present invention relates to a reclining seat which mounts onto the tailgate of a vehicle.

BACKGROUND OF THE INVENTION

Currently, there are a number of solutions for creating a better tailgating experience. Some of these solutions focus on the cooking aspect of tailgating such as adaptations to grills and smokers, while others focus on seating. These other solutions for seating attempt to offer a traditional seating option such as folding chairs, but these solutions generally lack comfort and a place to put your drink as you balance your plate of food. Folding chairs can be bulky to store alongside a cooler, grill, or table to place condiments and utensils depending on the storage space of the vehicle. Still other solutions seek to use a table and chairs for seating and eating, but these solutions are sometimes limited in space where the users are restricted to one parking spot when they go tailgating.

Therefore, it is an object of the present invention to provide an apparatus that attaches to a truck tailgate for comfortable sitting in a more confined space. The present invention is able to be mounted onto a tailgate of a truck through a series of tailgate clips. The present invention allows for an easy to set up seat with an adjustable reclining backrest, headrests and footrests, and an awning. The tailgate lounge is designed to be transported on a raised tailgate. Through the use of clips holding the present invention in place, the tailgate lounge is able to be stored in a collapsed configuration on the tailgate outside of the truck bed, providing optimal storage space within the truck bed.

DETAIL DESCRIPTIONS OF THE INVENTION

All illustrations of the drawings are for the purpose of describing selected versions of the present invention and are not intended to limit the scope of the present invention.

The present invention seeks to improve the tailgating or traveling experience by providing a means of seating that is conveniently mounted onto the tailgate of a truck. Through mounting on a tailgate, the present invention allows the user more useable space when the facilities of the event restrict the available space to each participant, in comparison to traditional means of portable seating, such as folding or travel chairs.

Figure 1:
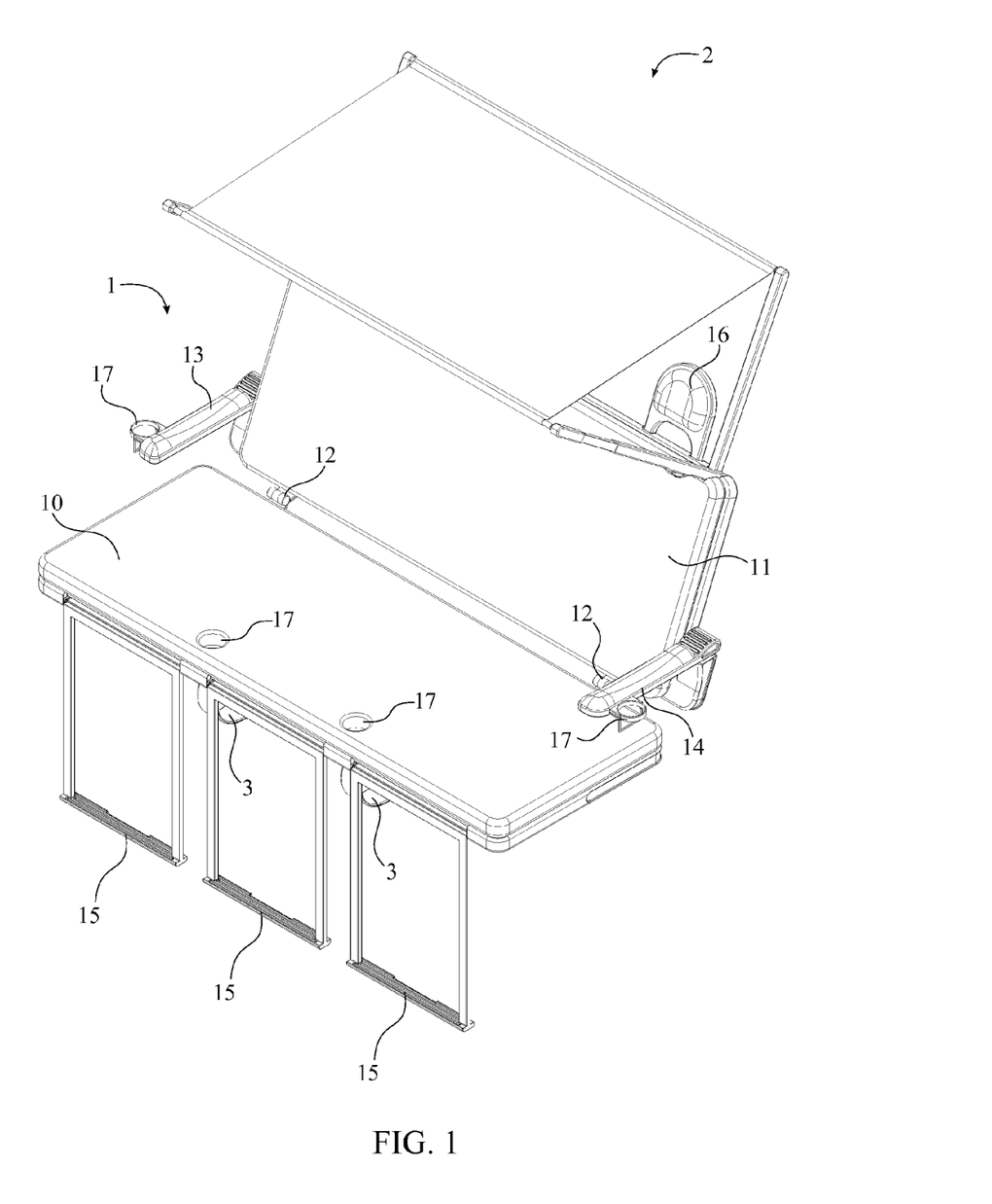
FIG. 1 is a perspective view of the present invention in the expanded configuration.

As shown in FIG. 1, the present invention is a seating attachment device for a tailgate. The present invention comprises a foldable bench 1, a collapsible awning 2, and a plurality of tailgate clips 3. The foldable bench 1 provides the support for a seated user, while the plurality of tailgate clips 3 secure the present invention to a tailgate of a truck. The collapsible awning 2 provides shade and some protection from inclement weather.

The general arrangement of the aforementioned components allows the present invention to more effectively and efficiently function. The foldable bench 1 comprises a seat 10, a reclining backrest 11, and a variable angular locking mechanism 12. The seat 10 provides a surface for the user to sit upon, while the reclining backrest 11 provides support to the user's back while they are in a seated position during use of the present invention. The variable angular locking mechanism 12 allows for the reclining backrest 11 to be supported in several angles to the seat 10 through a locking hinged connection. In accordance to FIG. 2, the seat 10 comprises a sitting surface 100 and a base surface 101. The sitting surface 100 provides an interface which the user is in physical contact with while the device is in use. The base surface 101 interfaces with the tailgate of the vehicle the present invention is mounted upon. The sitting surface 100 and the base surface 101 are positioned opposite to each other through the seat 10.

Figure 3:
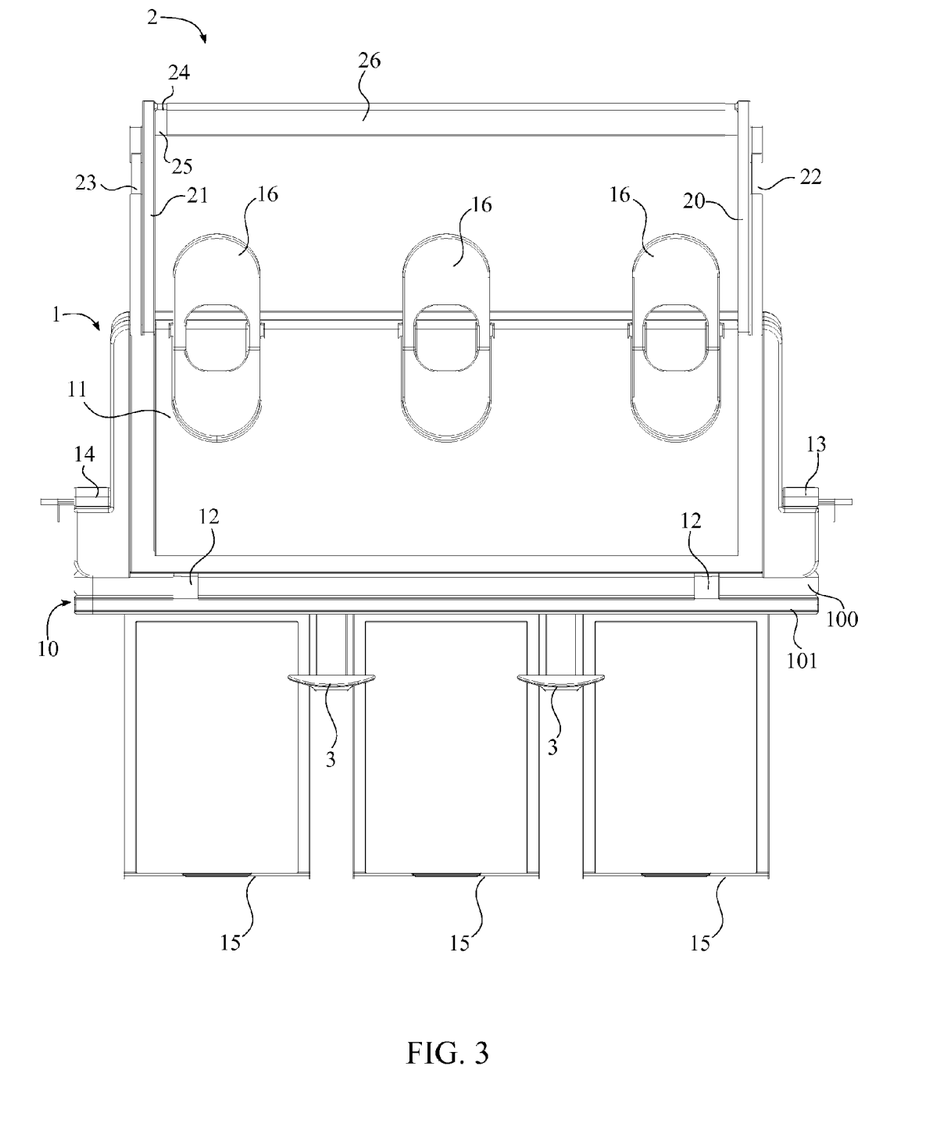
FIG. 3 is a rear view of the present invention in the expanded configuration.
Figure 4:
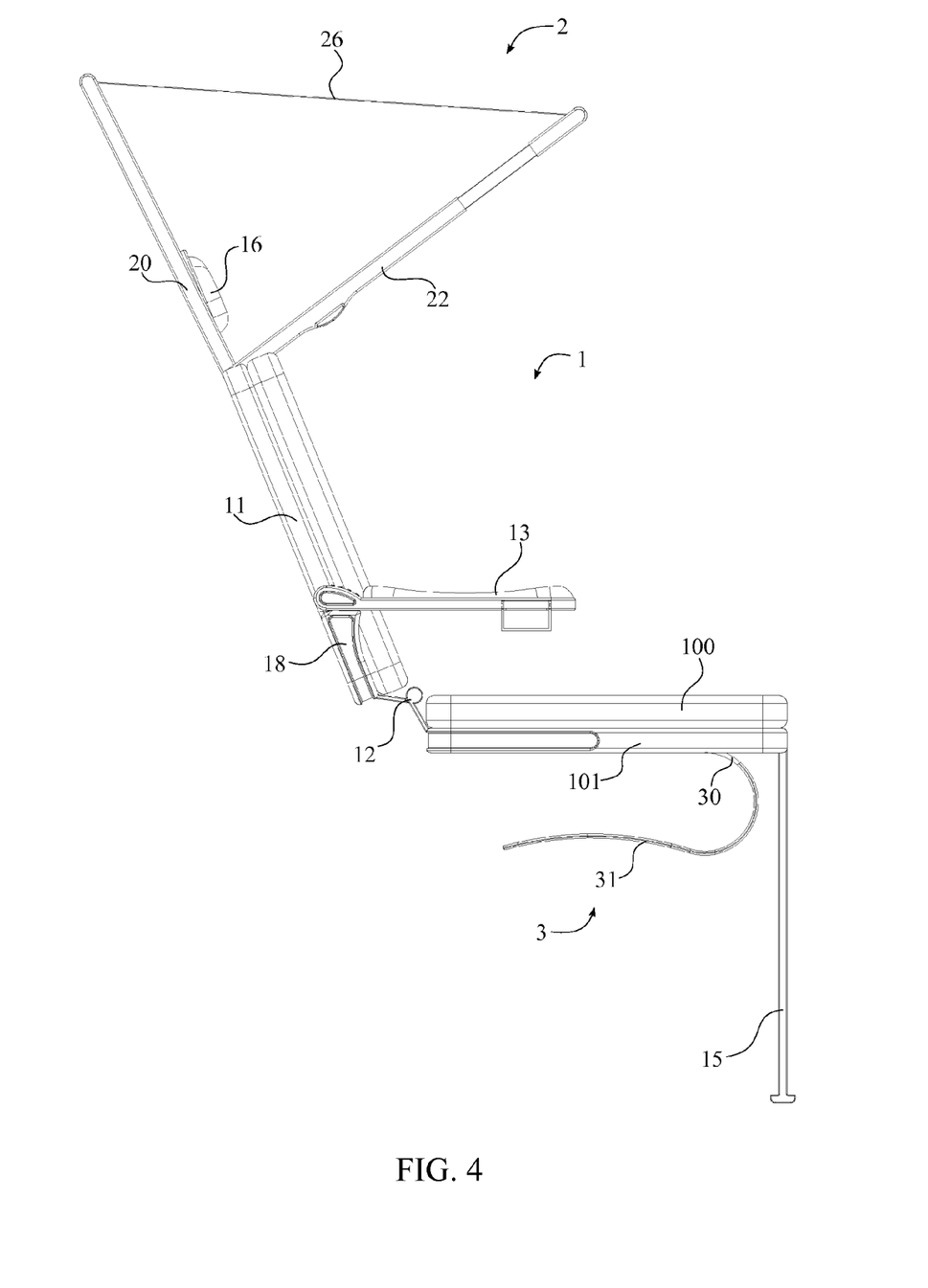
FIG. 4 is a left side view of the present invention in the expanded configuration.
Figure 9:
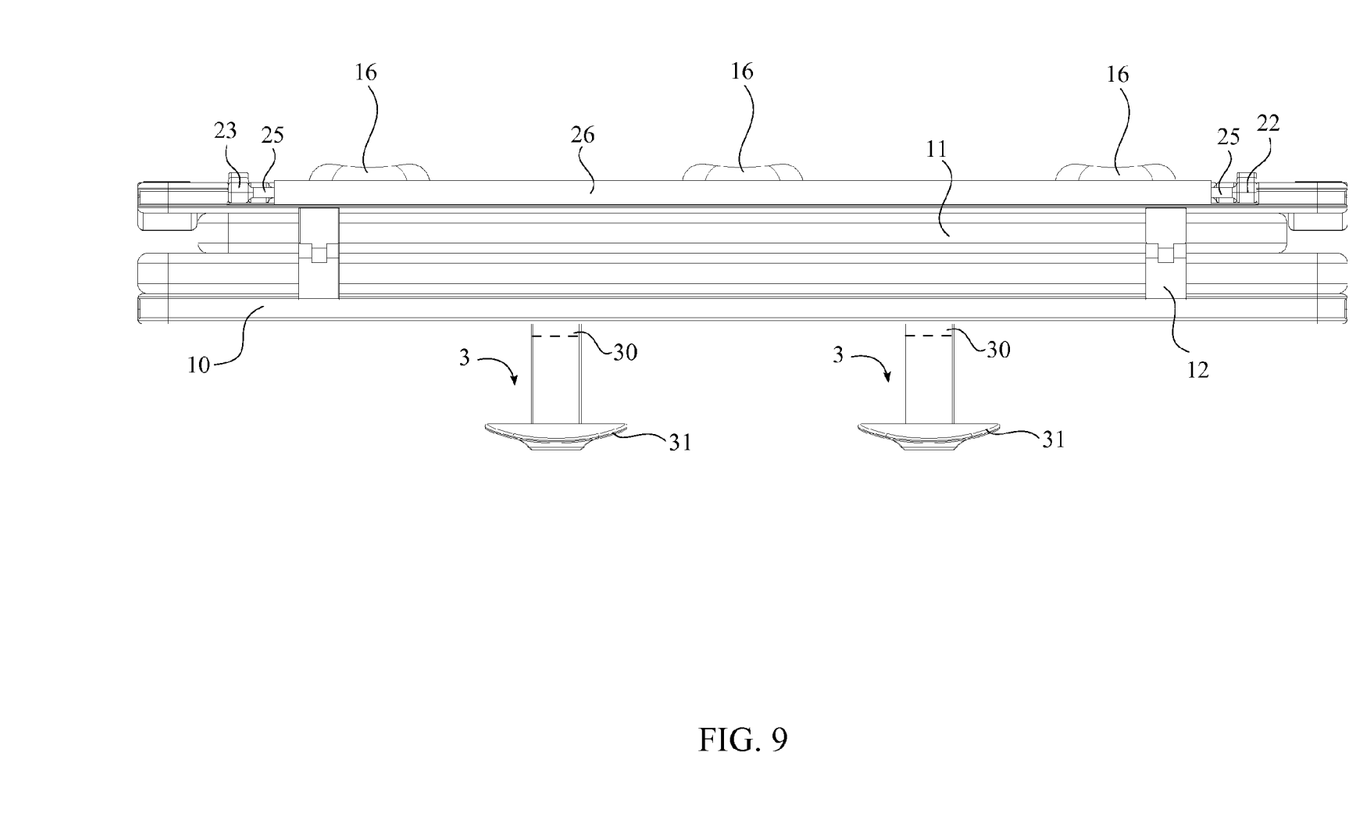
FIG. 9 is a rear view of the present invention in the collapsed configuration.
Figure 10:
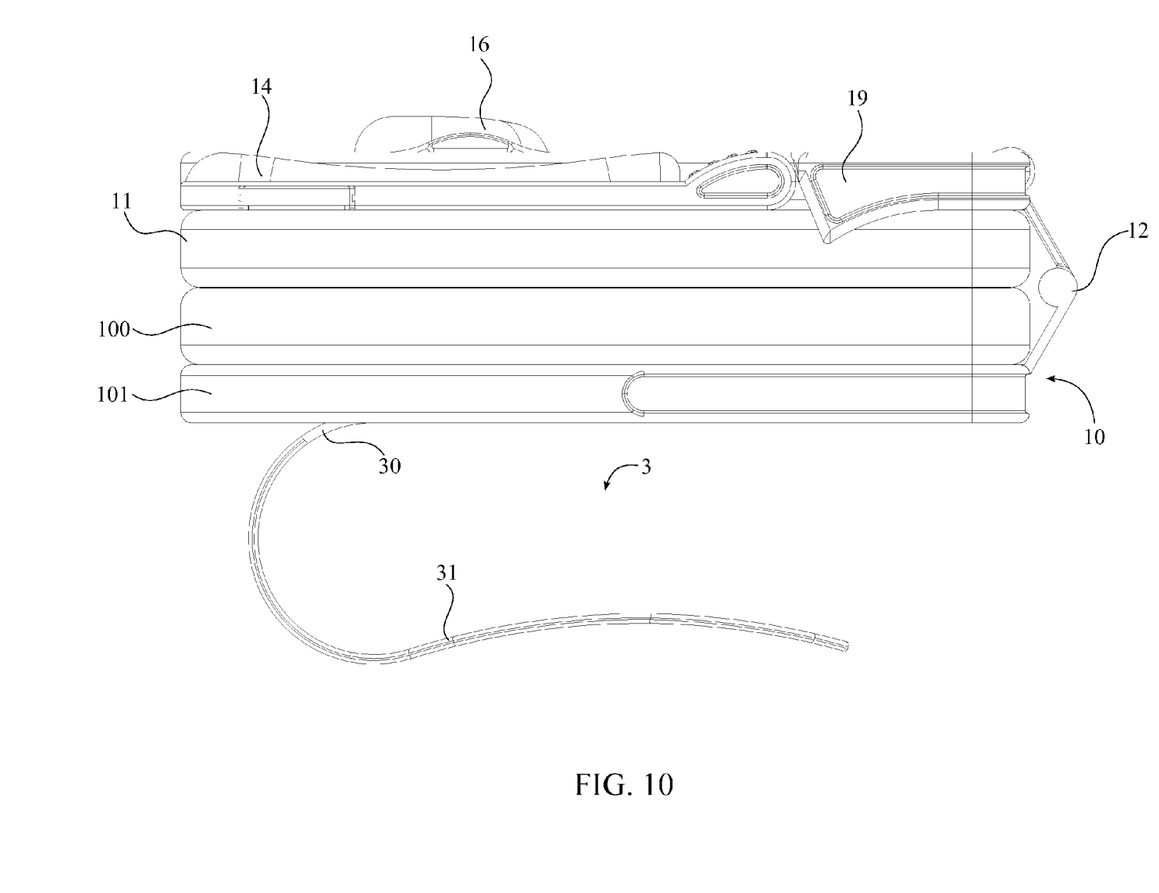
FIG. 10 is a right side view of the present invention in the collapsed configuration.
Figure 11:
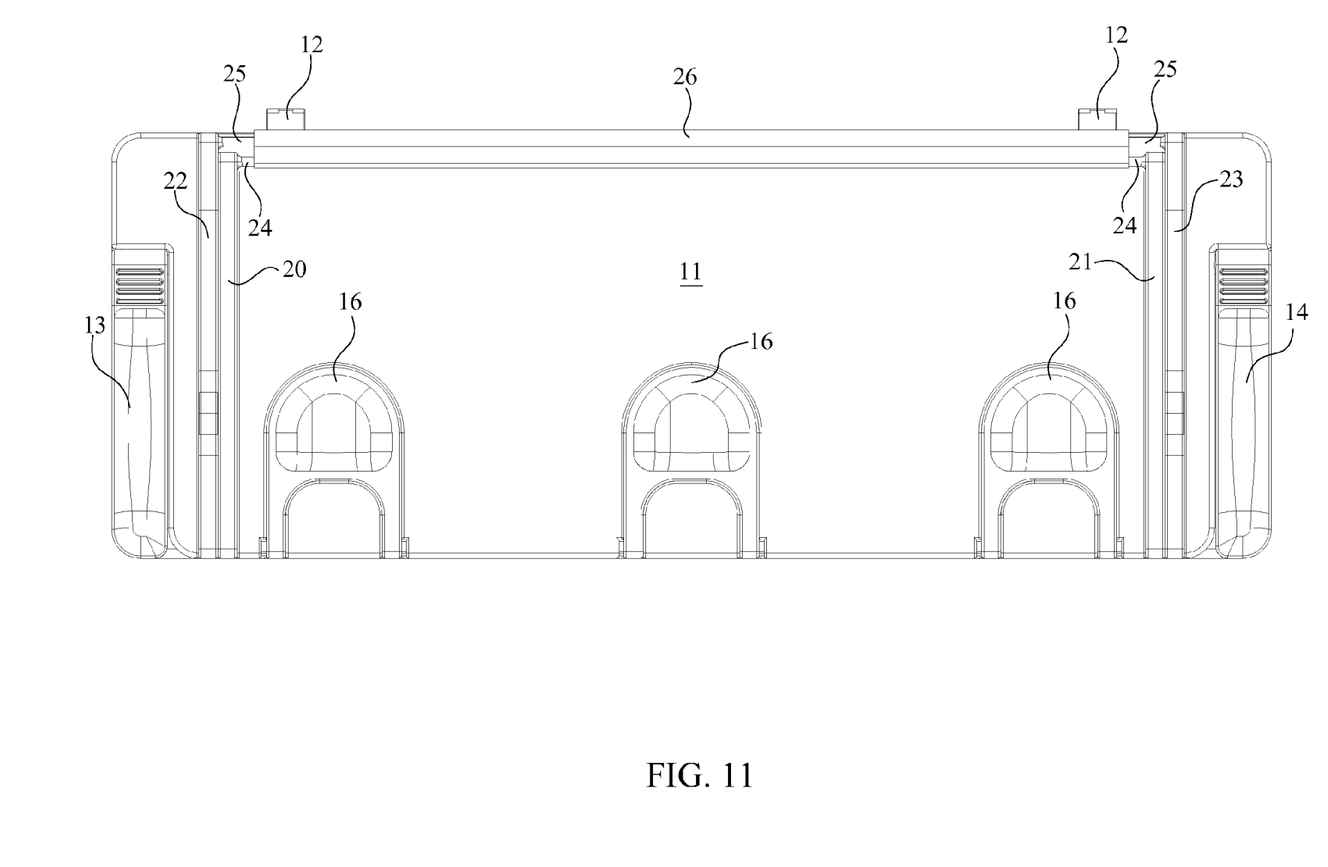
FIG. 11 is a top view of the present invention in the collapsed configuration.
Figure 12:
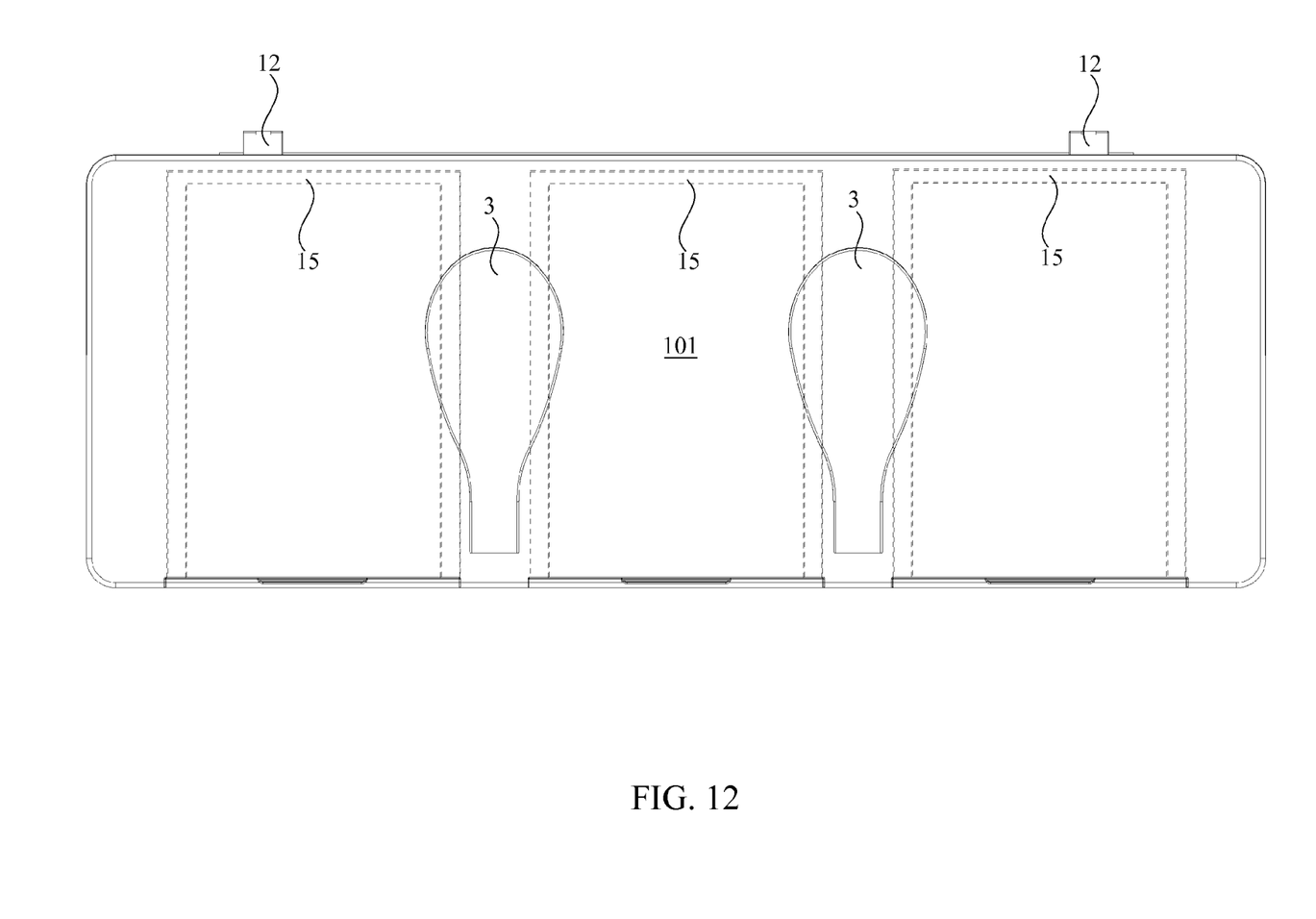
FIG. 12 is a bottom view of the present invention in the collapsed configuration, where the at least one foot rest is seen positioned within the seat.

Further, each of the plurality of tailgate clips 3 comprises a fixed portion 30 and a bracing portion 31, as shown in FIG. 4, FIG. 9, and FIG. 10. The fixed portion 30 is the means of attachment for the bracing portion 31 onto the base surface 101. The bracing portion 31 includes, but is not limited to a clip, mounting bracket, or other suitable means of attachment. The fixed portion 30 is adjacently mounted to the seat 10 opposite the reclining backrest 11, while the bracing portion 31 is positioned across the base surface 101 of the seat 10. The bracing portion 31 is opposite to the seat 10 along the tailgate of a vehicle when the present invention is operatively mounted on a tailgate to prevent the seat 10 from sliding when in use or in transportation. The collapsible awning 2 is hingedly and adjacently connected to the reclining backrest 11, opposite the seat 10, such that the collapsible awning 2 pivots from the reclining backrest 11 over the seat 10 to provide shade or a cover for inclement weather, as shown in FIG. 1 to FIG. 6.

Figure 2:
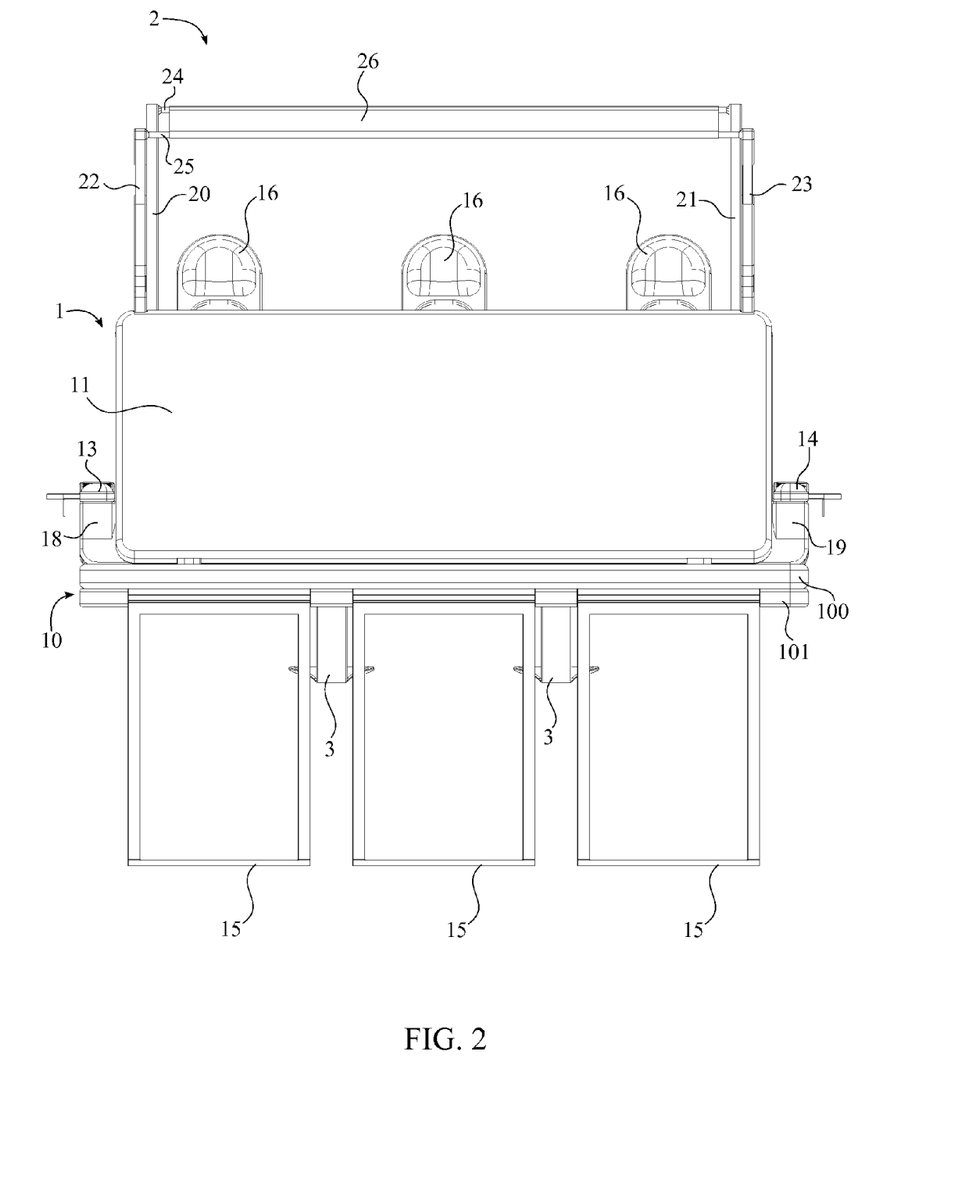
FIG. 2 is a front view of the present invention in the expanded configuration.
Figure 7:
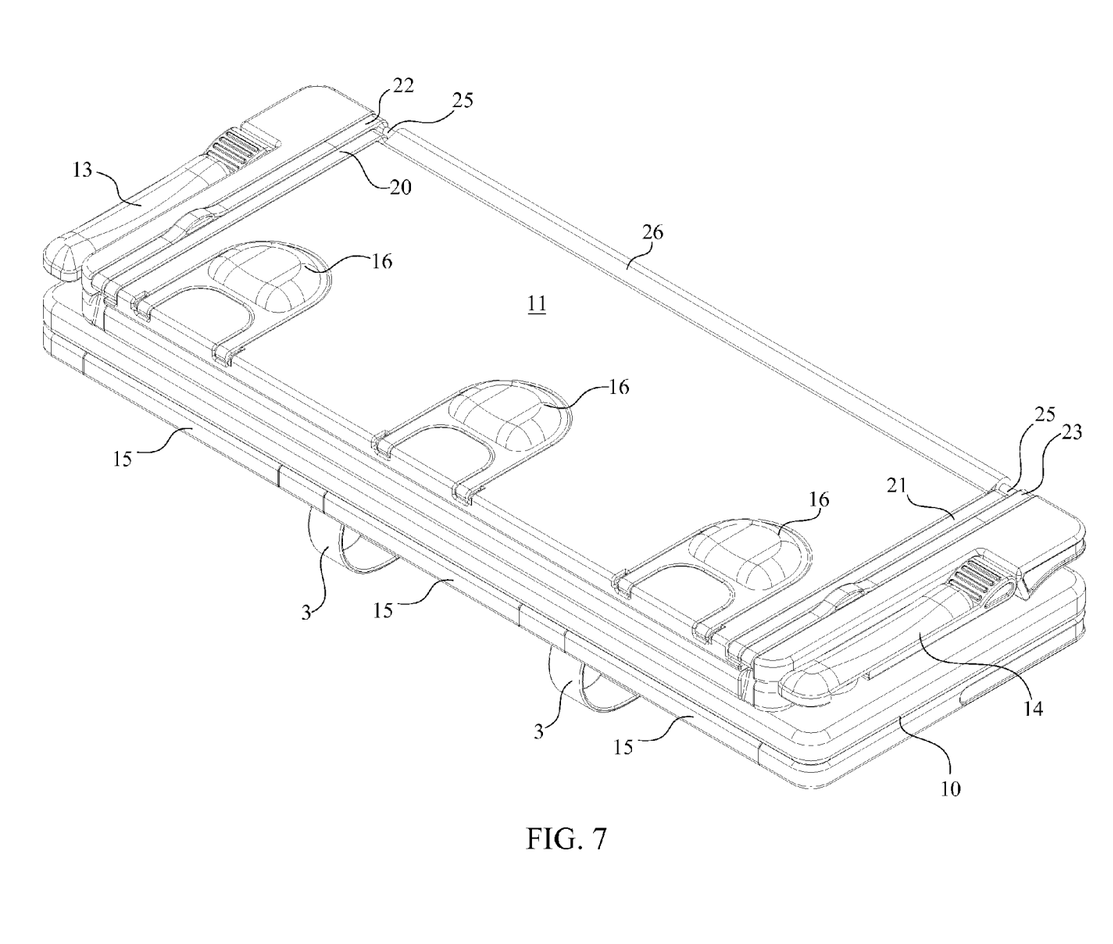
FIG. 7 is a perspective view of the present invention in the collapsed configuration.
Figure 8:
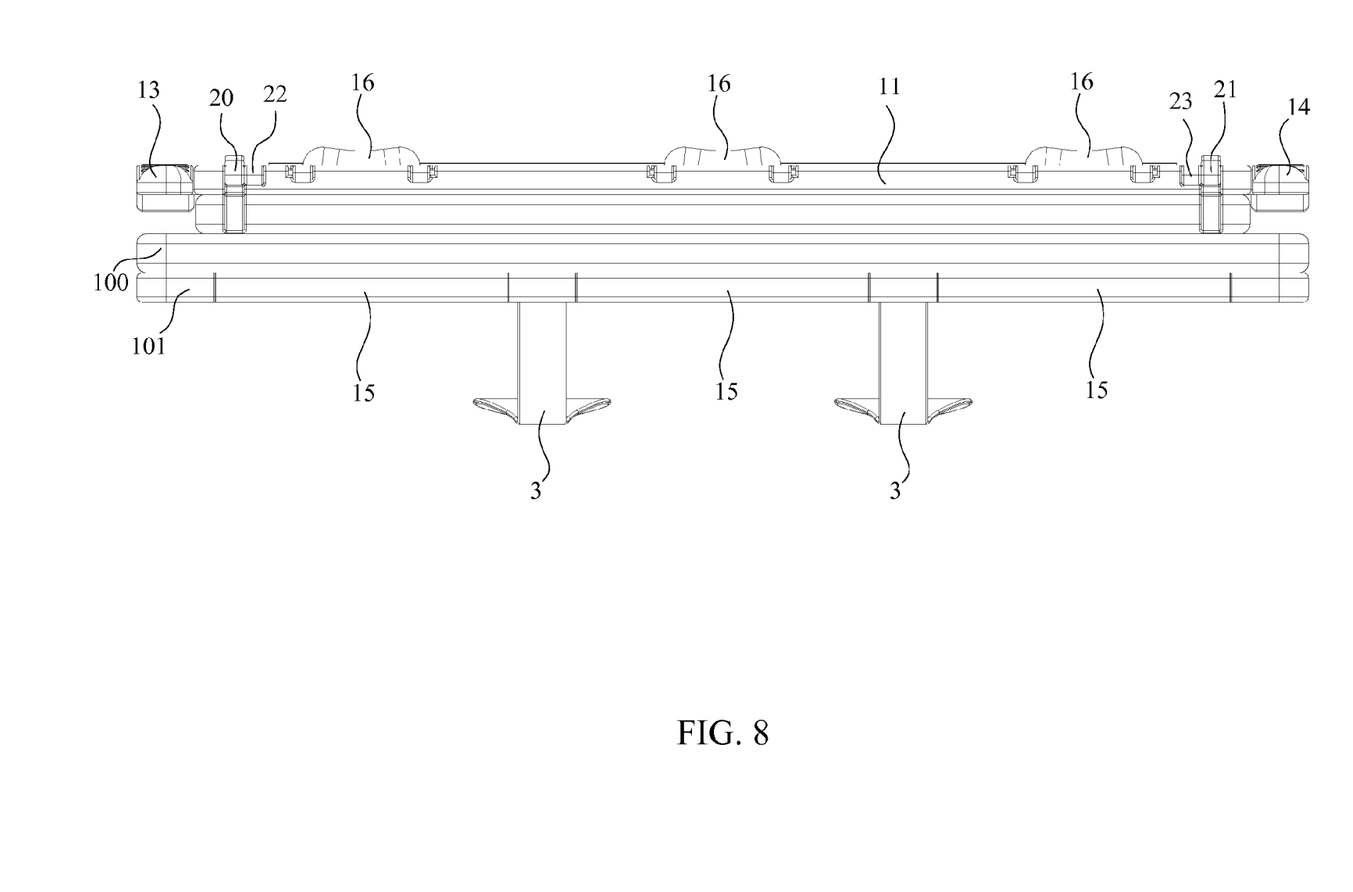
FIG. 8 is a front view of the present invention in the collapsed configuration.

In accordance to FIG. 2, FIG. 3, and FIG. 7, the foldable bench 1 further comprises a first armrest 13, a second armrest 14, at least one pocket footrest 15, and at least one headrest 16. The first armrest 13 and the second armrest 14 provide support for the user's arms to relax their arms while in a seated positioned during use of the present invention. Similarly, the at least one pocket footrest 15 allows the user to relax their legs without suspending them from the tailgate. The at least one headrest 16 provides support for the head and neck of the user. The first armrest 13 is pivotably connected to the reclining backrest 11 in between the collapsible awning 2 and the seat 10. The second armrest 14 is similarly connected by a pivot to the reclining backrest 11 in between the awning and the seat 10. The second armrest 14 is positioned opposite the first armrest 13 along the reclining backrest 11. The foldable bench 1 further comprises a first stop 18 and a second stop 19. The first stop 18 and the second stop 19 are laterally mounted to the reclining backrest 11 and adjacent to the first armrest 13 and the second armrest 14, respectively. The first stop 18 and the second stop 19 restrict the rotation of the first armrest 13 and the second armrest 14 from parallel with the reclining backrest 11 to parallel with the seat 10. The at least one pocket footrest 15 is slideably and pivotably connected into the seat 10 opposite the reclining backrest 11, allowing the at least one pocket footrest 15 to slide in and out of the seat 10 and to rotate when fully extended from the seat 10. The at least one headrest 16 is hingedly and adjacently connected to the reclining backrest 11 opposite the seat 10.

The collapsible awning 2 comprises a first rigid support 20, a second rigid support 21, a first telescopic support 22, a second telescopic support 23, a first crossbar 24, a second crossbar 25, and a canopy 26, as shown in FIG. 2, FIG. 3, FIG. 5 and FIG. 7. The first rigid support 20, the second rigid support 21, the first telescopic support 22 and the second telescopic support 23 support the first crossbar 24 and the second crossbar 25. The first crossbar 24 and the second crossbar 25 support the canopy 26. The canopy 26 provides the user with cover from direct sunlight or inclement weather. The first rigid support 20 and the second rigid support 21 are pivotably connected to the reclining backrest 11, opposite the seat 10. Also, the first rigid support 20 and the second rigid support 21 are positioned opposite each other along a length of the reclining backrest 11. The first telescopic support 22 and the second telescopic support 23 are laterally and pivotably connected to the first rigid support 20 and the second rigid support 21, respectively. The first crossbar 24 is connected in between the first rigid support 20 and the second rigid support 21, while the second crossbar 25 is connected in between the first telescopic support 22 and the second telescopic support 23. The canopy 26 is mounted across the first crossbar 24 and the second crossbar 25.

The present invention makes use of two main operative configurations: an expanded configuration and a collapsed configuration. The expanded configuration is the preferred configuration for use where the user is able to be seated on the present invention comfortably. The collapsed configuration is used for storage and transportation of the present invention as it reduces the total volume required to store the present invention.

In accordance to the expanded configuration, which is detailed in FIG. 1 to FIG. 6, the reclining backrest 11 is positioned at an angle to the seat, where the angle is greater than or equal to ninety degrees. The first armrest 13 and the second armrest 14 are positioned parallel to the seat 10. The at least one headrest 16 is positioned parallel and adjacent to the reclining backrest 11. The at least one headrest 16 and the seat 10 are positioned opposite each other along the width of the reclining backrest 11. The at least one pocket footrest 15 is externally positioned to the seat 10 about a pivot point. The first rigid support 20 and the second rigid support 21 are positioned opposite the seat 10. The first telescopic support 22 is positioned at an angle to the first rigid support 20. The second telescopic support 23 is positioned parallel to the first telescopic support 22 to prevent torsion of the first crossbar 24 and the second crossbar 25.

Further, the collapsed configuration is detailed in FIG. 7 to FIG. 12. In the collapsed configuration, the reclining backrest 11 is positioned parallel and adjacent to the seat 10. The first armrest 13 and the second armrest 14 are positioned parallel to the reclining backrest 11. The at least one headrest 16 is positioned parallel and adjacent to the reclining backrest 11. The at least one headrest 16 and the seat 10 are positioned opposite each other through a thickness of the reclining backrest 11 and locked into position through a locking mechanism. The possible locking mechanisms used include but are not limited to a clip, pin, straps, or other similarly appropriate mechanisms. The at least one pocket footrest 15 is internally positioned within the seat 10. The first rigid support 20 and the second rigid support 21 are positioned parallel and adjacent to the reclining backrest 11. The first telescopic support 22 is parallel to the first rigid support 20. Similarly, the second telescopic support 23 is parallel to the second rigid support 21. The first telescopic support 22 and the second telescopic support 23 are adjacent to the reclining backrest 11 along the width of the reclining backrest 11. The first rigid support 20, the second rigid support 21, the first telescopic support 22, and the second telescopic support 23 are secured to the reclining backrest 11 through similar mechanisms as the at least one headrest 16. The fastening mechanism prevents the aforementioned components from becoming dislodged during transportation of the present invention.

Figure 5:
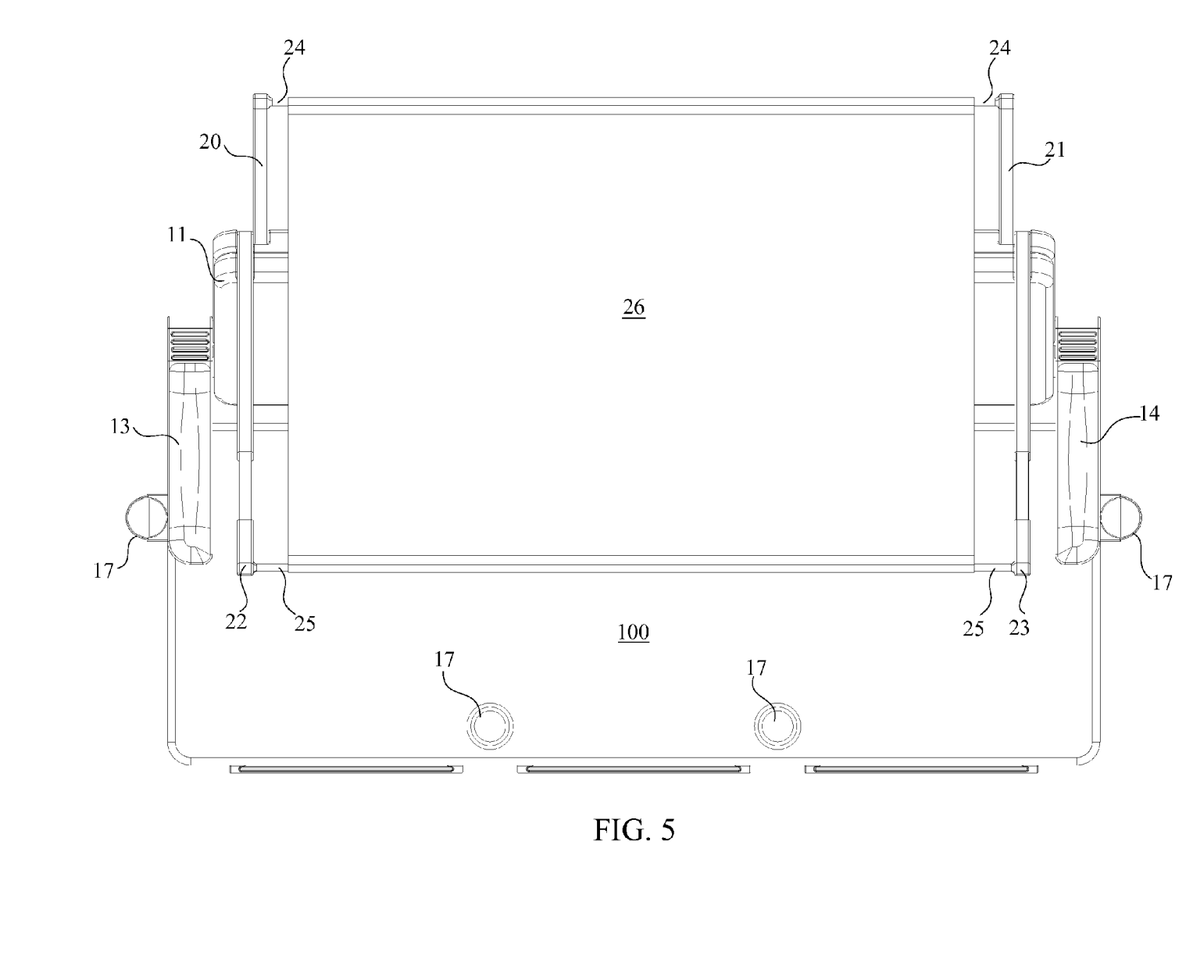
FIG. 5 is a top view of the present invention in the expanded configuration.
Figure 6:
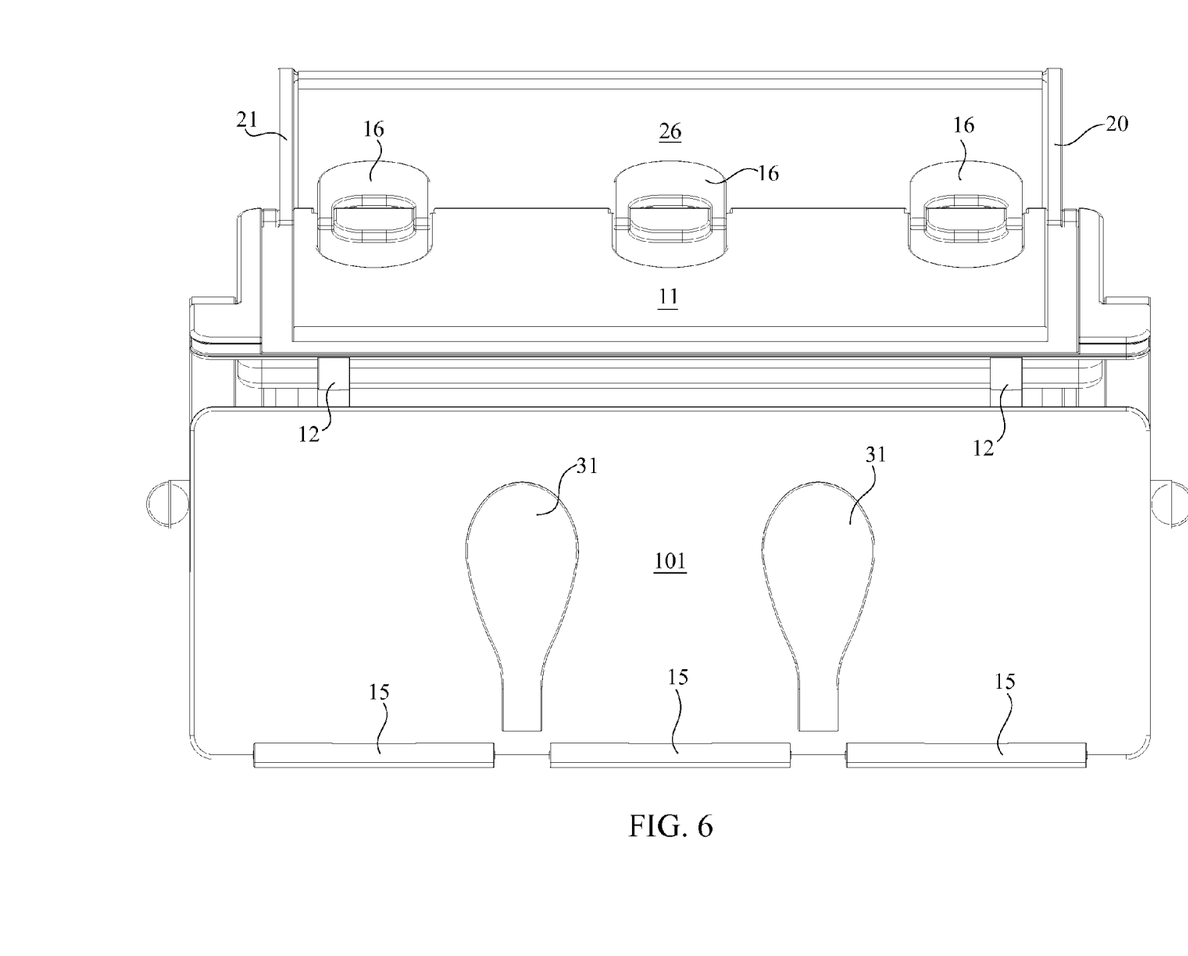
FIG. 6 is a bottom view of the present invention in the expanded configuration.

In some embodiments of the present invention, the first armrest 13, the second armrest 14, and the seat 10 each comprise at least one cup holder 17 as shown in FIG. 1 and FIG. 5. The at least one cup holder 17 allows the user can place a beverage container to be secured, such that it will not spill the contents when the beverage container is jarred. The at least one cup holder 17 for both the first armrest 13 and the second armrest 14 are distally mounted to the first armrest 13 and the second armrest 14. The at least one cup holder 17 of the seat 10 traverses thought the seat 10 such that a beverage container can be placed within the seat 10 to be secured, opposite the reclining backrest 11.

In some embodiments of the present invention, the foldable bench 1 comprises an audio output system. The audio output system comprises at least one speaker, an audio input mechanism, and a power source. The at least one speaker and the audio input mechanism are electrically connected to the power source. The power source provides electrical power to the at least one speaker and the audio input mechanism. The audio input mechanism is positioned along either the first armrest 13 or the second armrest 14. While an auxiliary audio port is preferred as the audio input mechanism, the audio input mechanism can be a short range radio receiver such as BLUETOOTH, a docking station such as an IPOD docking station, or any other similar means of audio input. The speakers amplify and output the audio signal received from the audio input mechanism. The speakers are positioned within the reclining backrest 11, such that the audio is acoustically outputted and easily heard by a user sitting on the present invention.

Although the invention has been explained in relation to its preferred embodiment, it is to be understood that many other possible modifications and variations can be made without departing from the spirit and scope of the invention as hereinafter claimed.

What is claimed is:

1. A seating attachment device for a tailgate comprises:
   a foldable bench;
   a collapsible awning;
   a plurality of tailgate clips configured for removable attachment to the tailgate;
   the foldable bench comprises a seat, an reclining backrest, and a variable angular locking mechanism;
   each of the plurality of tailgate clips comprises a fixed portion and a bracing portion;
   the seat comprises a sitting surface and a base surface;
   the seat being hingedly and adjacently connected to the reclining backrest by the variable angular locking mechanism;
   the sitting surface and a base surface being positioned opposite to each other through the seat;
   the fixed portion for each of the plurality of tailgate clips being adjacently mounted to the seat, opposite the reclining backrest;
   the bracing portion for each of the plurality of tailgate clips being positioned across and spaced apart from the base surface;
   the collapsible awning being hingedly and adjacently connected to the reclining backrest, opposite to the seat;
   the foldable bench further comprises a first armrest, a second armrest, at least one pocket footrest, and at least one headrest;
   the first armrest being pivotably and adjacently connected to the reclining backrest in between the awning and the seat;
   the second armrest being pivotably and adjacently connected to the reclining backrest in between the awning and the seat;
   the at least one pocket footrest being slideably connected into seat, opposite the reclining backrest; and
   the at least one headrest being hingedly and adjacently connected to the reclining backrest opposite the seat.

2. The seating attachment device for a tailgate as claimed in claim 1 comprises:
   the first armrest and the second armrest being opposite each other along the reclining backrest.

3. The seating attachment device for a tailgate as claimed in claim 1 comprises:
   wherein the foldable bench is in a collapsed configuration;
   the reclining backrest being positioned parallel and adjacent to the seat;
   the first armrest and the second armrest being positioned parallel to the reclining backrest;
   the at least one headrest being positioned parallel and adjacent to the reclining backrest;
   the at least one headrest and the seat being positioned opposite to each other through a thickness of the reclining backrest; and
   the at least one pocket footrest being internally positioned within the seat.

4. The seating attachment device for a tailgate as claimed in claim 1 comprises:
   wherein the foldable bench is in a expanded configuration;
   the reclining backrest being positioned at an angle to the seat, wherein the angle is greater than or equal to 90 degrees;
   the first armrest and the second armrest being positioned parallel to the seat;
   the at least one headrest being positioned parallel and adjacent to the reclining backrest;
   the at least one headrest and the seat being positioned opposite to each other along a width of the reclining backrest; and
   the at least one pocket footrest being externally positioned to the seat about a pivot point.

5. The seating attachment device for a tailgate as claimed in claim 1 comprises:
   the foldable bench further comprises a first stop and a second stop;
   the first stop being laterally mounted to the reclining backrest adjacent to the first armrest; and
   the second stop being laterally mounted to the reclining backrest adjacent to the second armrest.

6. The seating attachment device for a tailgate as claimed in claim 1 comprises:
   the collapsible awning comprises a first rigid support, a second rigid support, a first telescopic support, second telescopic support, a first crossbar, a second crossbar, and a canopy;
   the first rigid support being pivotably and adjacently connected to the reclining backrest, opposite the seat;
   the second rigid support being pivotably and adjacently connected to the reclining backrest, opposite the seat;
   the first rigid support and the second rigid support being opposite each other along the reclining backrest;
   the first telescopic support being laterally and pivotably connected to the first rigid support;
   the second telescopic support being laterally and pivotably connected to the second rigid support;
   the first crossbar being connected in between the first rigid support and the second rigid support;
   the second crossbar being connected in between the first telescopic support and the second telescopic support; and
   the canopy being mounted across the first crossbar and the second crossbar.

7. The seating attachment device for a tailgate as claimed in claim 6 comprises:
   wherein the collapsible awning is in a collapsed configuration;
   the first rigid support and the second rigid support being positioned parallel and adjacent to the reclining backrest;
   the first telescopic support being parallel to the first rigid support;
   the second telescopic support being parallel to the second rigid support; and
   the first telescopic support and the second telescopic support being adjacent to the reclining backrest along a width of the backrest.

8. The seating attachment device for a tailgate as claimed in claim 6 comprises:
   wherein the collapsible awning is in a expanded configuration;
   the first rigid support and the second rigid support being opposite the seat;
   the first rigid support and the second rigid support being parallel to each other;
   the first telescopic support being positioned at an angle to the first rigid support; and
   the second telescopic support being positioned parallel to the first telescopic support.

9. A seating attachment device for a tailgate comprises:
   a foldable bench;
   a collapsible awning;
   a plurality of tailgate clips configured for removable attachment to the tailgate;

the foldable bench comprises a seat, an reclining backrest, a variable angular locking mechanism, a first armrest, a second armrest;

each of the plurality of tailgate clips comprises a fixed portion and a bracing portion;

the seat comprises a sitting surface and a base surface;

the seat being hingedly and adjacently connected to the reclining backrest by the variable angular locking mechanism;

the sitting surface and a base surface being positioned opposite to each other through the seat;

the fixed portion for each of the plurality of tailgate clips being adjacently mounted to the seat, opposite the reclining backrest;

the bracing portion for each of the plurality of tailgate clips being positioned across and spaced apart from the base surface;

the collapsible awning being hingedly and adjacently connected to the reclining backrest, opposite to the seat;

the first armrest being pivotably and adjacently connected to the reclining backrest in between the awning and the seat;

the second armrest being pivotably and adjacently connected to the reclining backrest in between the awning and the seat;

the collapsible awning comprises a first rigid support, a second rigid support, a first telescopic support, second telescopic support, a first crossbar, a second crossbar, and a canopy;

the first rigid support being pivotably and adjacently connected to the reclining backrest, opposite the seat;

the second rigid support being pivotably and adjacently connected to the reclining backrest, opposite the seat;

the first rigid support and the second rigid support being opposite each other along the reclining backrest;

the first telescopic support being laterally and pivotably connected to the first rigid support;

the second telescopic support being laterally and pivotably connected to the second rigid support;

the first crossbar being connected in between the first rigid support and the second rigid support;

the second crossbar being connected in between the first telescopic support and the second telescopic support; and the canopy being mounted across the first crossbar and the second crossbar.

10. The seating attachment device for a tailgate as claimed in claim 9 comprises:

the first armrest and the second armrest being opposite each other along the reclining backrest.

11. The seating attachment device for a tailgate as claimed in claim 9 comprises:

the foldable bench further comprises a first stop and a second stop;

the first stop being laterally mounted to the reclining backrest adjacent to the first armrest; and the second stop being laterally mounted to the reclining backrest adjacent to the second armrest.

12. The seating attachment device for a tailgate as claimed in claim 9 comprises:

wherein the collapsible awning is in a collapsed configuration;

the first rigid support and the second rigid support being positioned parallel and adjacent to the reclining backrest;

the first telescopic support being parallel to the first rigid support;

the second telescopic support being parallel to the second rigid support; and the first telescopic support and the second telescopic support being adjacent to the reclining backrest along a width of the backrest.

13. The seating attachment device for a tailgate as claimed in claim 9 comprises:

wherein the collapsible awning is in a expanded configuration;

the first rigid support and the second rigid support being opposite the seat;

the first rigid support and the second rigid support being parallel to each other;

the first telescopic support being positioned at an angle to the first rigid support; and the second telescopic support being positioned parallel to the first telescopic support.

14. The seating attachment device for a tailgate as claimed in claim 9 comprises:

the foldable bench further comprises at least one pocket footrest, and at least one headrest;

the at least one pocket footrest being slideably connected into seat, opposite the reclining backrest; and the at least one headrest being hingedly and adjacently connected to the reclining backrest opposite the seat.

15. The seating attachment device for a tailgate as claimed in claim 14 comprises:

wherein the foldable bench is in a collapsed configuration;

the reclining backrest being positioned parallel and adjacent to the seat;

the first armrest and the second armrest being positioned parallel to the reclining backrest;

the at least one headrest being positioned parallel and adjacent to the reclining backrest;

the at least one headrest and the seat being positioned opposite to each other through a thickness of the reclining backrest; and the at least one pocket footrest being internally positioned within the seat.

16. The seating attachment device for a tailgate as claimed in claim 14 comprises:

wherein the foldable bench is in a expanded configuration;

the reclining backrest being positioned at an angle to the seat, wherein the angle is greater than or equal to 90 degrees;

the first armrest and the second armrest being positioned parallel to the seat;

the at least one headrest being positioned parallel and adjacent to the reclining backrest;

the at least one headrest and the seat being positioned opposite to each other along a width of the reclining backrest; and the at least one pocket footrest being externally positioned to the seat about a pivot point.

* * * * *